United States Patent [19]
Jamzadeh et al.

[11] Patent Number: 5,504,583
[45] Date of Patent: Apr. 2, 1996

[54] GENERATION OF PRINTS FROM AN ARRAY OF IMAGES AND INFORMATION RELATIVE TO SUCH IMAGES

[75] Inventors: Feraydoon S. Jamzadeh, Fairport; Patrick A. Cosgrove, Honeoye Falls, both of N.Y.

[73] Assignee: Eastman Kodak Company, Rochester, N.Y.

[21] Appl. No.: 21,915

[22] Filed: Feb. 24, 1993

[51] Int. Cl.⁶ .............................. H04N 1/23; H04N 1/46; G03B 27/44; G06K 9/00
[52] U.S. Cl. .............. 358/302; 358/504; 355/54; 382/319; 347/232
[58] Field of Search ........................ 358/296, 300, 358/302, 406, 474, 504, 530, 523; 355/54, 40; 382/63, 319; 347/112, 114, 115, 171, 217, 221, 232, 184

[56] References Cited

U.S. PATENT DOCUMENTS

| | | | |
|---|---|---|---|
| 4,638,371 | 1/1987 | Milch | 358/293 |
| 4,639,769 | 1/1987 | Fleisher et al. | 358/27 |
| 4,966,285 | 10/1990 | Otake et al. | 206/455 |
| 5,040,026 | 8/1991 | Jamzadeh et al. | 355/271 |
| 5,062,058 | 10/1991 | Morikawa | 358/75 |
| 5,164,837 | 11/1992 | Hirosawa | 358/296 |
| 5,173,783 | 12/1992 | Oku et al. | 358/302 |
| 5,175,628 | 12/1992 | Jamzadeh et al. | 358/300 |
| 5,184,227 | 2/1993 | Foley | 358/302 |
| 5,194,946 | 3/1993 | Morikawa et al. | 358/406 X |
| 5,210,600 | 5/1993 | Hirata | 358/406 X |
| 5,223,954 | 6/1993 | Miyakawa et al. | 358/474 |
| 5,369,426 | 11/1994 | Jamzadeh | 346/157 |

*Primary Examiner*—Peter S. Wong
*Assistant Examiner*—Eric Frahm
*Attorney, Agent, or Firm*—Lawrence P. Kessler

[57] ABSTRACT

In an electronic color printing process in which an array of multicolor images from a filmstrip is reproduced on print receiver sheets or alternative storage media from color information signals representing a plurality of sets of color separation image information, producing prints from the array of multicolor images. Such print production, comprises prescanning, at low resolution, an array of different multicolor images contained on a filmstrip. Information data, obtained during the prescan, of scene content of the respective image frames, and additional information data of at least one of where frames of the array are located in the filmstrip, what type of filmstrip is being scanned, and what are the conditions of each frame, is stored. Look-up-tables based on the stored information data are defined, and the stored information data is processed with the defined look-up-tables to produce prints of the array of multicolor images.

15 Claims, 4 Drawing Sheets

GENERATION OF PRINTS FROM AN ARRAY OF IMAGES AND INFORMATION RELATIVE TO SUCH IMAGES

BACKGROUND OF THE INVENTION

The present invention relates in general to electronic color printing, and more particularly, to generation, by electronically printing, of prints from an array of images, for example, contained in frames of a filmstrip, and information relative to such images respectively.

Electronic printing, such as electrophotographic reproduction, by an apparatus for photofinishing of images contained in an original filmstrip (e.g., a 35 mm color negative filmstrip) has been shown and described in U.S. Pat. No. 5,040,026, issued Aug. 13, 1991, in the names of Jamzadeh et al. Such apparatus operates to sequentially scan the respective image frames of an original filmstrip and produce, by an electrophotographic process, full color prints on a non-photosensitive print receiver sheet. In the electrophotographic process, a set of color separation marking particle images (e.g., cyan, magenta, and yellow) are formed on a reusable photoconductive recording member, one set for each of the respective original image frames on the filmstrip. The set of color separation marking particle images are transferred in register to a print receiver sheet to form the desired full color print.

With electrophotographic reproduction, in order to facilitate handling of the print receiver sheets, as well as to enhance the efficiency of the overall print-making process, each print receiver sheet is considerably larger than the commonly desired sizes of photographic prints. Several color prints are formed on each receiver sheet. For example, assuming a print receiver sheet having a size (in inches) of 12×18, it is disclosed in the aforementioned '026 patent that nine 4×6 prints be produced on the receiver sheet in a three-by-three, two dimensional array. This three-by-three array, referred to as a "9-up" format, would be a desirable format due to the current popularity of photographic prints of this 4×6 inch size. In the event larger prints are desired (e.g., 5×7 inch prints), four of such prints may be formed on a print receiver sheet of this size in a two-by-two, or "four-up", format. After forming multiple images on the print receiver sheet, the receiver sheet is then cut by any well known cutting and slitting apparatus to provide the smaller size prints or "snapshots".

In order to utilize electronic printing for an array of multicolor images contained on a filmstrip, the filmstrip must be scanned by an electronic color scanner which conventionally includes, for example, a color-responsive CCD (such as shown in U.S. Pat. Nos. 4,638,371, or 4,639,769). The scanner operates to produce, line-by-line and pixel-by-pixel, electronic signals representing the color content of each image contained in the scanned filmstrip. The signals are stored in a framestore (such as described in U.S. patent application Ser. No. 07/767,712, now Pat. No. 5,175,628, filed Sep. 30, 1991, in the names of Jamzadeh et al) to enable subsequent driving of an exposure device in the electronic printer.

Electronically produced signals are also capable of being used for storage of an array of multicolor images (contained in an original filmstrip) on alternative storage media such as a still video floppy or a video disc. Image regeneration apparatus are then required to read out the stored signals from the alternative storage media for display, for example, on a CRT or a standard television set. As discussed in U.S. Pat. No. 4,966,285, issued Oct. 30, 1990, in the names of Otake et al, it is desirable to make a print on a single print receiver sheet for a complete array of filmstrip frame images so that such images are readily viewable, such single print receiver sheet bearing the complete array of filmstrip frame images being referred to as an "index print". That is, when providing prints from a filmstrip containing an array (i.e., series) of images, or when an array of images is stored on alternative storage media, it is advantageous to provide the customer with a single sheet (the index print) containing all of the images, included with the image prints or the alternative storage media.

In the production of the index print according to the '285 patent, all of the image frames on the filmstrip are optically exposed, or electronically extracted from video discs or tapes containing full resolution images. This requires considerable storage media for printing the full resolution images. Further, all images are reproduced on the index print even, when certain of such images are of a quality which would yield no customer acceptable print (i.e., out-of-focus, blurred, or poorly exposed images). Moreover, all information on the edges of the filmstrip (e.g., frame numbers), which may at times be confusing or meaningless to the customer, are produced on the index print. At the same time, useful information (such as date, processor type and batch number, film type, or customer message, for example) is not provided (either on the index print or on the respective individual prints themselves). Additionally, to make the index print according to the '285 patent, a handling step, separate from the step for producing the individual prints, is required to hang the individual image frames into a sheet to permit exposure for making the index print. With this additional handling of the filmstrip, the undesirable results of damaging (e.g., scratching) the filmstrip or collecting dust thereon is increased.

SUMMARY OF THE INVENTION

In view of the foregoing discussion, this invention is directed to the production of prints, including an index print, for an array of image frames contained on a filmstrip wherein, with a minimum of handling and without having to provide media for storing full resolution images. The index print is produced containing only customer acceptable prints and with important customer information included therein. In an electronic color printing process in which an array of multicolor images contained on frames of a filmstrip is reproduced on print receiver sheets or alternative storage media from color information signals representing a plurality of sets of color separation image information prints are produced from the array of multicolor images.

Such print production, comprises prescanning, at low resolution, an array of multicolor images contained on frames of a filmstrip. Information data, obtained during the prescan, of scene content of the respective image frames, and additional information data of at least one of where frames of the array are located in the filmstrip, what type of filmstrip is being scanned, and what are the conditions of each frame, is stored. Look-up-tables based on the stored information data are defined, and the stored information data is processed with the defined look-up-tables to produce prints of the array of multicolor images.

According to this invention, the prints may be produced, at high resolution, on respective print receiver sheets or, at low resolution, as an index print, on a single print receiver sheet. As a further aspect of this invention, the additional information data may be printed in association with the respective image prints on the individual print receiver sheets or on the index print.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
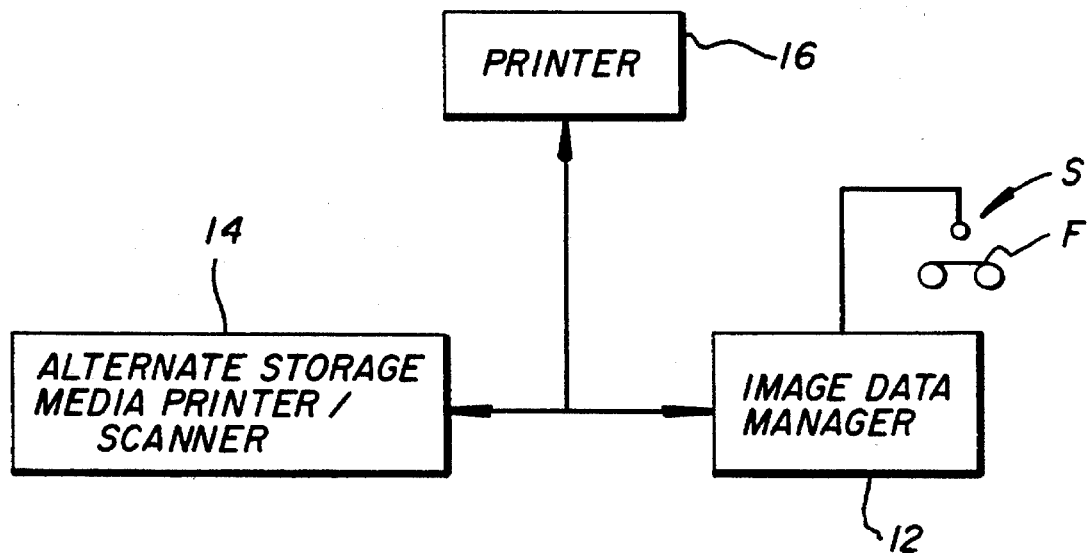
FIG. 1 is a schematic illustration of an arrangement for carrying out the generation of prints, including an index print, by electronic printing according to this invention.
Figure 2:
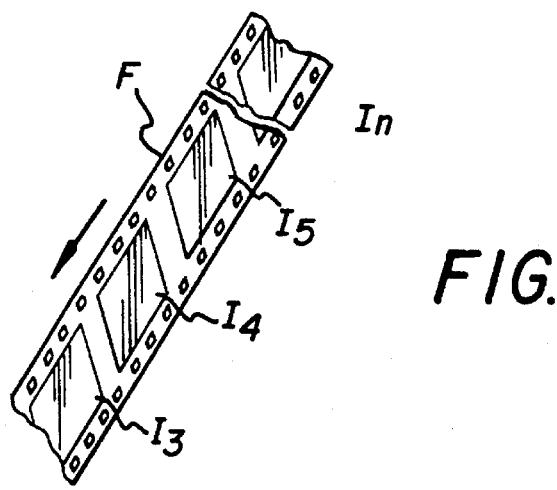
FIG. 2 is a view, in perspective, of a typical filmstrip containing an array of multicolor image frames.

Referring now to the accompanying drawings, FIG. 1 schematically illustrates an arrangement, designated generally by the numeral 10, for carrying out the generation of prints, including an index print, by electronic printing according to this invention. In such arrangement, a scanner S is located so as to scan a moving filmstrip F, containing a linear array of frames of multicolor images $I_1, I_2, \ldots I_n$ (see FIG. 2). The scanner S produces electrical signals representing the color image information in the array of image frames and information data related to respective individual images in the frame array. The signals are transmitted to an image information data manager 12 where the signals are processed and stored (as will be further discussed below). The processed/stored signals can then be utilized with a first recording apparatus 14 to selectively record the respective filmstrip frame images on alternative storage media, or with a second recording apparatus 16 to selectively record the respective filmstrip frame images (and related information data) on print receiving material.

The second recording apparatus 16, which forms an important part of this invention, includes an electrophotographic color printer capable of producing a plurality of multicolor image frames on a single print receiver sheet. The electrophotographic color printer, designated generally in FIG. 3 by the letter P, is basically of the type set forth in the aforementioned U.S. Pat. No. 5,040,026, and is described below in sufficient detail for a complete understanding of this invention. Of course, the second recording apparatus could alternatively be, for example, a color ink jet printer, a color thermal printer, or any other suitable color electronic printer.

The electrophotographic color printer P (see FIG. 3) comprises a reusable image recording element, for example, a photoconductive drum 20, which is rotated by a motor, not shown, in a clockwise direction (as viewed in FIG. 3) past a series of processing stations, all of which are well known in the art. These stations include a charging station 22 which operates to uniformly charge the photoconductive surface of the drum 20, and an exposure station 23. The exposure station 23 imagewise exposes the uniformly charged surface to create developable latent electrostatic images thereon. The exposure station may comprise a conventional LED printhead or, as scematically shown, a laser writer 24.

As drum 20 rotates, the intensity of the output beam of laser writer 24 is modulated with color-separated image information, whereby a series of latent electrostatic images are produced on the drum surface, each representing a color-separated image of the ultimately desired multicolor print. The series of electrostatic images on drum 20 is rendered visible with different color marking particles (e.g., cyan, magenta and yellow toner), by development stations 25, 26 and 27 to produce a series of related toner images. These color-separated toner images are then transferred in registration to the print receiver sheet R carried on the periphery of a transfer drum 28. The photoconductive drum 20 is subsequently cleaned at a cleaning station 29 and recycled through the electrophotographic image-forming process.

Print receiver sheets R are fed, seriatim, from a sheet supply 31 to an image-transfer station 32 defined by the nip between drum 20 and transfer drum 28. As each sheet approaches the image-transfer station 32, it is secured to the transfer drum 28 by vacuum means, gripping fingers or other suitable mechanisms. For example, the leading edge of the sheet can be secured to the transfer drum by vacuum through a row of vacuum ports 34 and the trailing end by vacuum through a row of vacuum ports 36. During each rotation of the transfer drum, one color-separated toner image is transferred to a receiver sheet.

After the transfer drum 28 has made three (four) revolutions and three related color-separated toner images (plus a black image if a forth revolution if employed) have been transferred, in superimposed registration, to the surface of a print receiver sheet R, the leading edge of the receiver sheet is stripped from the transfer of drum 28 by stripping mechanism 38. The print receiver sheet R is transported by further rotation of the transfer drum 28 onto a sheet transport 44 which carries it to a fusing device 45 where the transferred images are fixed to the sheet by heat and/or pressure, for example. The print receiver sheet R is then cut by any suitable cutting mechanism 46 to provide a plurality of smaller prints, each containing the reproduction from a single multicolor image frame. The resulting prints are collected in a tray 47 or more sophisticated print collecting device of any well known type.

Figure 3:
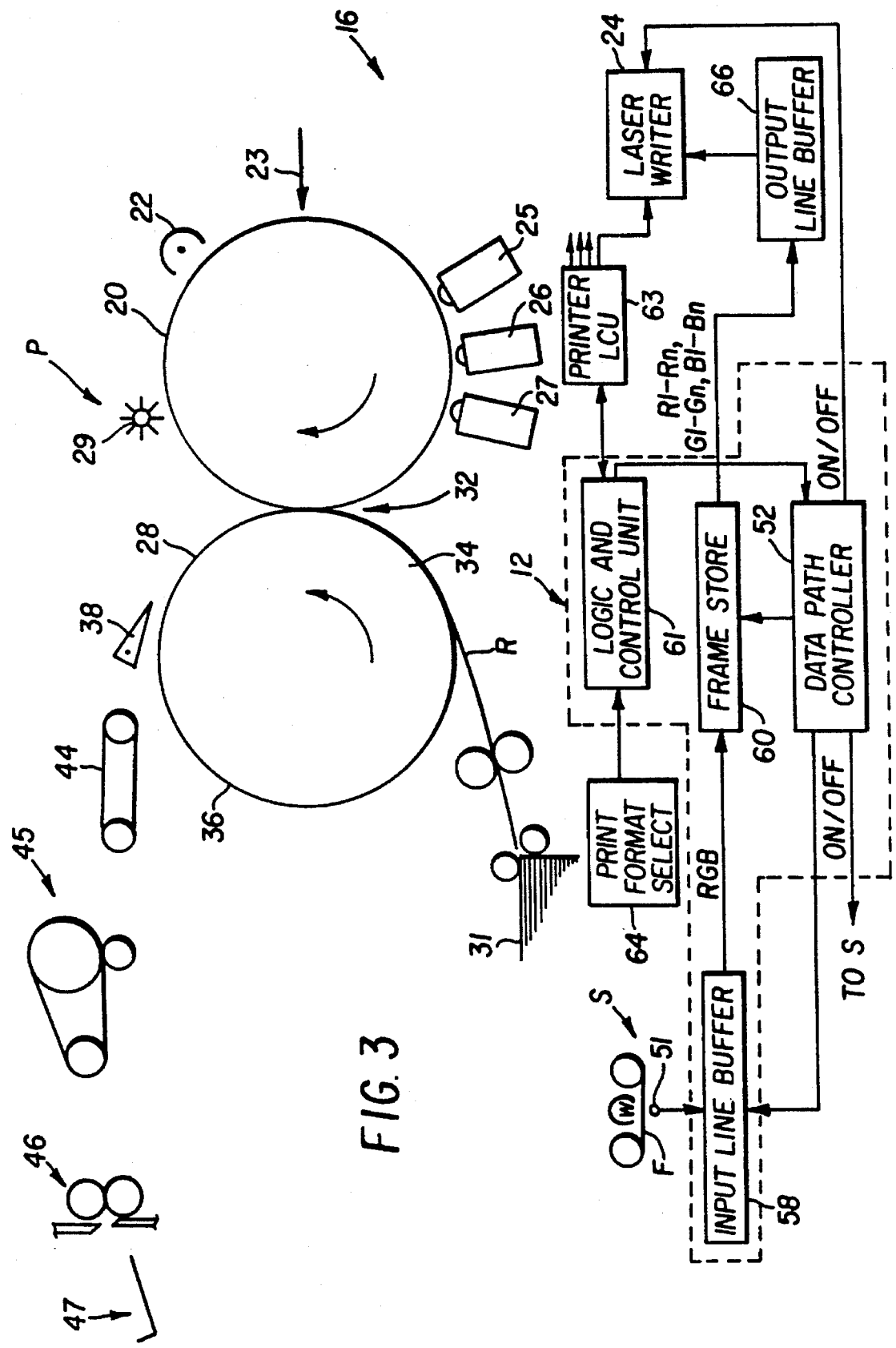
FIG. 3 is a generally schematic illustration of an exemplary electronic printing apparatus for carrying out the generation of prints, including an index print, or printing information data on individual prints, or the index print, according to this invention.
Figure 4:
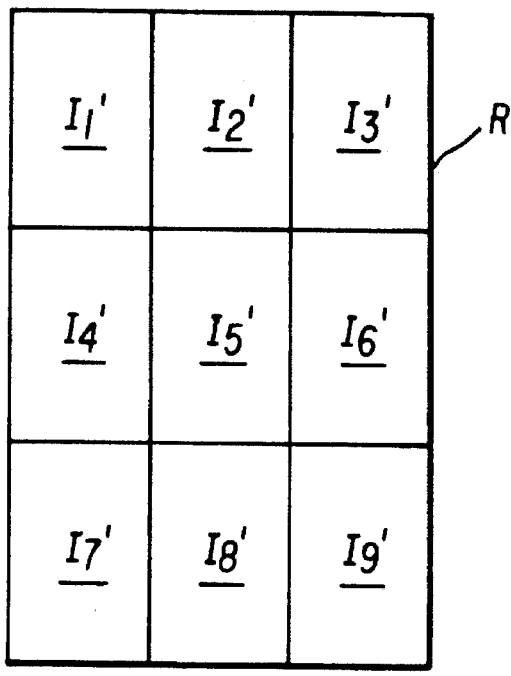
FIG. 4–6 illustrate various formats in which multicolor image frames can be printed by the electronic printing apparatus of FIG. 3.
Figures 5, 6:
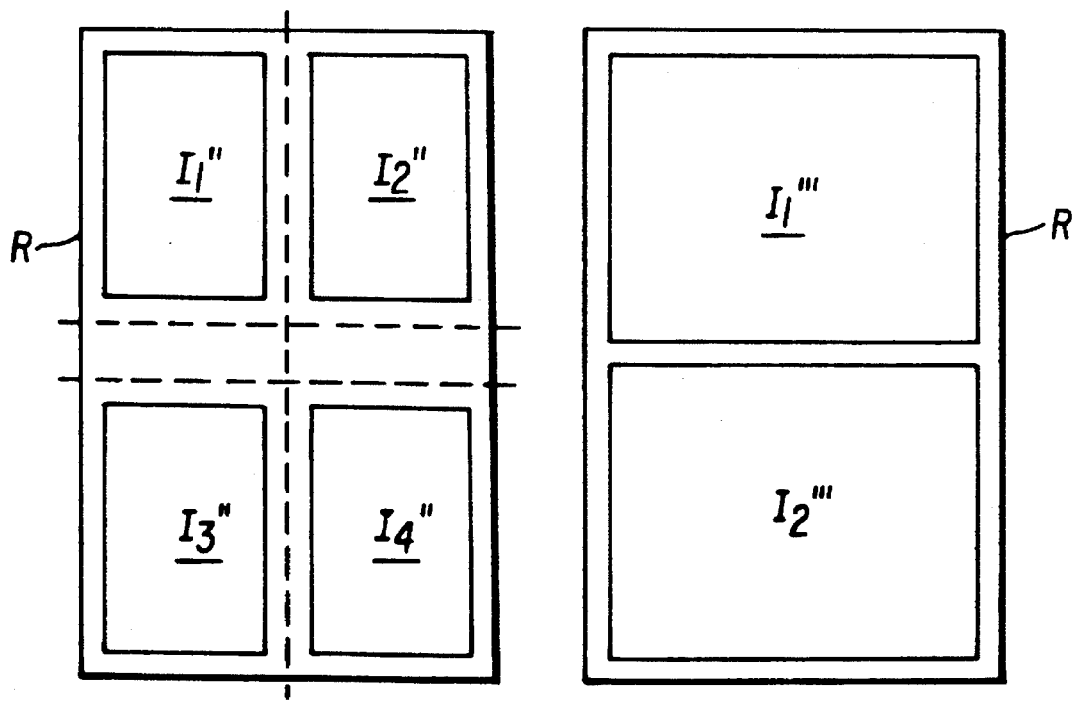

In the electrophotographic color printer P apparatus shown in FIG. 3, each print receiver sheet is of a relatively large size, for example, 12 inches by 18 inches. As shown in FIG. 4, such a print receiver sheet R can provide nine 4×6 inch print images ($I_1', I_2', \ldots I_9'$) exposed edge-to-edge with no waste. As mentioned above, this format is commonly referred to as the "9-up" format. The other print sizes will produce some waste with a 12×18 inch print receiver sheet. FIG. 5 illustrates a "4-up" format in which four 5×7 inch print images ($I_1'', I_2'', \ldots I_9''$) are formed on a 12×18 inch print receiver sheet. In FIG. 6, a "2-up" format is shown in which two 8×10 inch print images ($I_1''', I_2'''$) are formed on a 12×18 inch print receiver sheet.

The input signals to exposure station 23 are provided by a conventional electronic color scanner S which includes a color-responsive CCD 51 (such as shown, for example, in aforementioned U.S. Pat. Nos. 4,638,371 and 4,639,769). Scanner S operates to scan an original multicolor image (e.g., frames of a 35 mm color negative filmstrip) as the filmstrip F is moved past the scanner by any well known drive mechanism (not shown). The scan is accomplished line-by-line and pixel-by-pixel, to produce three color-separated signals, R,G and B, representing the color content of each of the scanned image frames in three spectral regions, i.e., the red (R), green (G) and blue (B) spectral regions. These R,G and B color-separated signals are produced substantially simultaneously and, as they are produced, they are fed to a framestore 60 (discussed below) via an input line buffer 58 of the image data manager 12. The latter serves to buffer a few lines of image data to account for any electronic protocol (SCSI communication) latencies at the scanner/framestore interface, and look-up-table needs inside the filmstrip scanner S.

A logic and control unit (LCU) 61 operates through a data path controller 62 to control the flow of data into and out of the framestore 60, and manage the whereabouts of data in the framestore (i.e. provide a bookkeeping function). The LCU 61 also cooperates with a logic and control unit (LCU) 63 for the electrophotographic color printer P. The LCU 63 receives inputs from various portions of the electrophotographic color printer, including encoders (not shown) associated with the photoconductive and transfer drums (20 and 28, respectively), and transducers associated with the various processing stations to manage the timing of the entire printing process for such apparatus.

One of the inputs to the LCU 61 is from a print format selector 64, whereby an operator can chose any of several different print sizes. Based on the format selected, the LCU 61 instructs the data path controller 62 to extract those pixels from the framestore 60 in the appropriate format required to produce the appropriate format image on a print receiver sheet R. For example, if 4×6 inch prints (i.e. "snapshots") are desired, the LCU 61 instructs the data path controller to extract the stored pixels in a format required to produce the 9-up format on the print receiver sheet. Similarly, if 5×7 inch prints are desired, the LCU 61 commands data path controller 62 to extract those pixels from memory in the required format to print images in the 4-up format. In either case, the framestore 60 is read out in a sequence required to produce multiple color-separated images on the photoconductive drum 20. The data read-out from the framestore 60 is applied to the laser writer 24 via an output line buffer 66 which serves to buffer a few lines of image information to account for latencies in the laser scanner/recording element interface, and data path image manipulation needs.

As will be readily appreciated, the amount of data required for making high quality prints from an array of image frames contained on a filmstrip is extensive. For example, to make a full resolution print of a single image frame of high quality requires scanning of the image frame to obtain data of the contained information of scene content at on the order of 2048 by 3072 pixels. The total data storage space for one separation of one filmstrip array image is about 6M bytes, and the number of image frames in a typical filmstrip array can be up to thirty-six (with three separations for each image frame). Such storage space exceeds the capacity of many computer systems, and may require a system with an impractically high cost storage capacity. This data storage limitation condition is further compounded when it is realized that additional information data, relative to the image frames on the filmstrip, above their respective scene content information data, must also be provided. Such additional information data, which is used to provide look-up-tables (LUT's) for the laser writer 24, may include where image frames of the array are located on the filmstrip, the type of filmstrip being scanned, or the conditions of each image frame.

Therefore, in accordance with this invention, the filmstrip F is first scanned by the scanner S at low resolution (referred to hereinafter as a prescan). The low resolution prescan of the scene content of an image frame on the filmstrip, accomplished at on the order of 128 by 192 pixels, has been found sufficient to provide enough scene content data information to enable a recognizable print of an image from an array of image frames on a filmstrip. Also, such low resolution prescan provides the necessary additional information data required for the LUT's needed for subsequent high resolution scanned printing of the filmstrip image frames. At this low resolution, the total data storage for an array of filmstrip image frames is on the order of 20K bytes for each separation, well within the data storage capacity of commonly available, relatively inexpensive computer systems.

Figure 7:
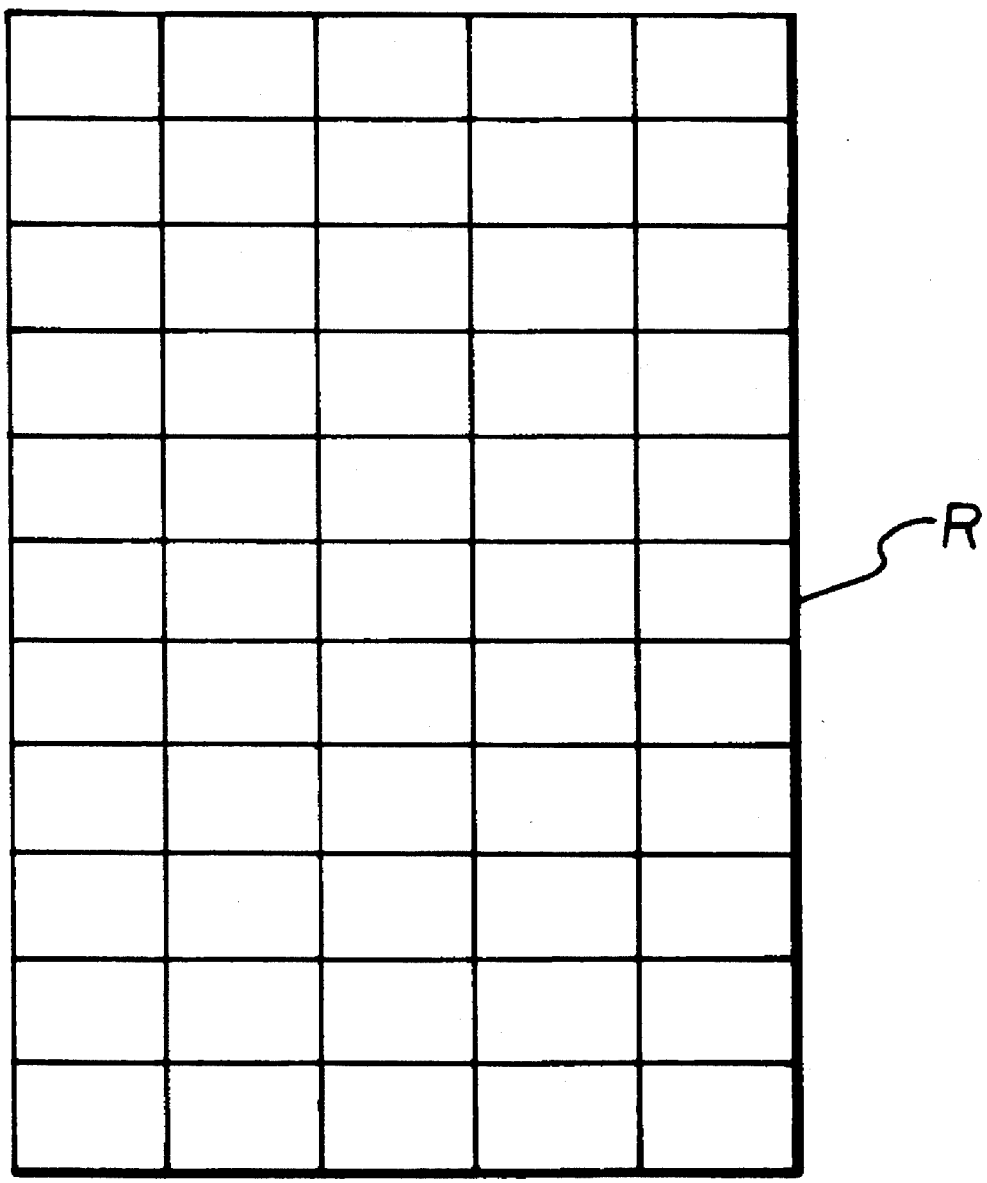
FIG. 7 is an illustration of an index print produced by the electronic printing apparatus of FIG. 3.

As discussed above, the low resolution prescan provides sufficient scene content data information to enable a recognizable print of an image from an array of image frames on a filmstrip. Also as discussed above, it is desirable to provide an index print (i.e., a print of all image frames in the filmstrip array on a single print receiver sheet) so that such image frames are readily and conveniently viewable at one time. Thus, according to this invention, the data information contained in the low resolution prescan is utilized to drive the laser writer 24 of the electrophotographic color printer P. In this manner, the data representing the scene content of the array of image frames expose the photoconductive drum 20 such that all of the image frames in such array are reproduced, in the described electrophotographic process, on a single print receiver sheet. The format for the placement of the prints of the image frames from the filmstrip image array may be for example as shown in FIG. 7. Of course, to present all of the image frames on the single print receiver sheet, the respective images are substantially reduced in size. At the reduced size, the scene content of the respective images, based on the data information from the low resolution prescan, is sufficient to enable recognition of the respective scenes.

It should be pointed out that the capture of the additional data information (i.e., data relative to where image frames of the array are located on the filmstrip, the type of filmstrip being scanned, or the conditions of each image frame) during the prescan provides the opportunity to more efficiently use the electrophotographic process in creating the index print. That is, the prescan additional data information enables the LCU 61 to determine the scene content of each of the image frames in a filmstrip image array. If the scene content of any of the image frames would provide an unacceptable print, from a customer standpoint (due to for example being out of focus, blurred, or poorly exposed), the LCU 61 may be programmed to inhibit the printing of that particular image frame.

Figure 8:
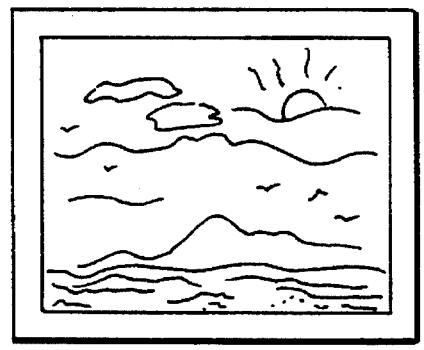
FIG. 8 is an illustration of an individual print of an image, from an array of image frames, containing customer usable information data printed thereon.

Further, the additional data information obtained during the prescan is also available to be placed in a format whereby such data information may be reproduced on the index print or on the individual high resolution prints made of the respective image frames from the filmstrip image array. Specifically, when producing the index print, the additional data information may be used to drive the laser writer 24 to reproduce the additional data information associated with a particular image frame next to the reproduction of that image frame on the index print. Similarly, when producing an individual print in any of the above described formats, the additional data information may be used to drive the laser writer 24 to reproduce the additional data information associated with a particular image frame next to the reproduction of that image frame on the print receiver sheet. Thus, when the print receiver sheet is cut to provide the individual prints, the associated additional information stays in association with the respective individual prints (see FIG. 8). For example, the additional information may be reproduced in the border of the print, or duping the electrophotographic process, the print receiver sheet may be turned over and the additional information reproduced on the back of each point. The additional information is helpful in many ways. It can be used during later reproductions of a print to help in the reproduction process, or it can be used directly by the customer to determine ways to duplicate or improve picture taking ability.

The invention has been described in detail with particular reference to preferred embodiments thereof, but it will be understood that variations and modifications can be effected within the spirit and scope of the invention as set forth in the claims.

What is claimed is:

1. In an electronic color printing process in which images from an array of images from respective frames of a filmstrip are provided on print receiver sheets or alternative storage media from information signals representing image information, a method for producing prints from the array of images, such method comprising the steps of:
   a) prescanning, at low resolution, an array of images contained on respective frames of a filmstrip;
   b) strong information data, obtained during low resolution prescanning, of the scene content of the respective images, and additional information data of at least one of (i) where frames of the image array are located in the filmstrip, (ii) the type of filmstrip being scanned, and (iii) the conditions of each image; and
   c) defining look-up-tables based on the information data stored in step (b) by which prints of the array of images may subsequently be produced.

2. In an electronic color printing process in which images from an array of multicolor images from respective frames of a filmstrip are provided on print receiver sheets or alternative storage media from color information signals representing a plurality of sets of color separation image information, a method for producing prints from the array of multicolor images, such method comprising the steps of:
   a) prescanning, at low resolution, an array of multicolor images contained on respective frames of a filmstrip;
   b) storing information data, obtained during low resolution prescanning, of the scene content of the respective images, and additional information data of at least one of (i) where frames of the image array are located in the filmstrip, (ii) the type of filmstrip being scanned, and (iii) the conditions of each image;
   c) defining look-up-tables based on the information data stored in step (b); and
   d) processing the information data stored in step (b) with the look-up-tables defined in step (c) to produce prints of the array of multicolor images.

3. The method for producing prints from the array of images of claim 2 wherein said step of processing information data includes the step of scanning the array of multicolor images contained on frames of a filmstrip at high resolution whereby the produced prints are of high quality.

4. The method for producing prints from the array of images of claim 3 wherein said step of processing information data includes the step of producing individual prints on respective print receiver sheets.

5. The method for producing prints from the array of images of claim 4 wherein said step of processing information data includes the step of producing additional information data stored in step (b), respectively associated with individual frames of a filmstrip, on the respective produced prints.

6. The method for producing prints from the array of images of claim 2 wherein said step of processing information data includes the step of producing a print of the entire array of multicolor images contained on frames of a filmstrip on an index print receiver sheet.

7. The method for producing prints from the array of images of claim 6 wherein said step of processing information data includes the step of producing additional information data stored in step (b), respectively associated with individual frames of a filmstrip, on the index print.

8. In an electronic color printing process in which images from an array of multicolor images from a filmstrip are reproduced on print receiver sheets or alternative storage media from color information signals representing a plurality of sets of color separation image information, a method for producing an index print of the array of multicolor images, such method comprising the steps of:
   a) prescanning, at low resolution, an array of multicolor images contained on a filmstrip;
   b) strong information data, obtained during low resolution prescanning, of the scene content of the respective images, and additional information data of at least one of (i) where frames of the image array are located in the filmstrip, (ii) the type of filmstrip being scanned, and (iii) the conditions of each image;
   c) defining look-up-tables based on the information data stored in step (b); and
   d) processing the information data stored in step (b) with the look-up-tables defined in step (c) to produce on one print receiver sheet, at low resolution, an index print of the array of multicolor images.

9. The method for producing an index print from the array of multicolor images of claim 8 wherein said step of processing information data includes the step of producing additional information data stored in step (b), respectively associated with individual frames of a filmstrip, on the index print.

10. An electronic color printer in which images from an array of multicolor images from a filmstrip are reproduced on print receiver sheets or alternative storage media from color information signals representing a plurality of sets of color separation image information, said electronic color printer comprising:
   a) means for prescanning, at low resolution, an array of multicolor images contained on respective frames of a filmstrip;
   b) means associated with said prescanning means for storing information data, obtained during the prescan, of the scene content of the images, and at least one of (i) where frames of the image array are located in the filmstrip, (ii) the type of filmstrip being scanned, and (iii) the conditions of each image;
   c) means for defining look-up-tables based on the information data stored by said storing means; and
   d) means for processing information data from an array of multicolor images contained on a filmstrip or the like with the look-up tables defined by said look-up-table defining means to produce prints of the array of multicolor images.

11. The electronic color printer of claim 10 wherein said means for processing information data includes means for scanning the array of multicolor images contained on frames of a filmstrip at high resolution whereby the produced prints are of high quality.

12. The electronic color printer of claim 11 wherein said means for processing information data includes means for producing individual prints on respective print receiver sheets.

13. The electronic color printer method of claim 12 wherein means for processing information data includes means for producing additional information data stored in step (b), respectively associated with individual frames of a filmstrip, on the respective produced prints.

14. The electronic color printer method of claim 10 wherein said means for processing information data includes means for producing a print of the entire array of multicolor images contained on frames of a filmstrip, at low resolution, on an index print receiver sheet.

15. The electronic color printer method of claim 14 wherein said means for processing information data includes means for producing additional information data stored in step (b), respectively associated with individual frames of a filmstrip, on the index print.

* * * * *

UNITED STATES PATENT AND TRADEMARK OFFICE
CERTIFICATE OF CORRECTION

PATENT NO. : 5,504,583
DATED : Apr. 2, 1996
INVENTOR(S) : Feraydoon S. Jamzadeh, et al It is certified that error appears in the above-indentified patent and that said Letters Patent is hereby corrected as shown below:

| | |
|---|---|
| Title page, Section [57], Abstract, line 16 | Delete "army" and substitute --array--. |
| Column 7, line 33 | Delete "strong" and substitute --storing--. |
| Column 8, line 67 | Delete "or the like" |

Signed and Sealed this

Twenty-fourth Day of June, 1997

*Attest:*

BRUCE LEHMAN

*Attesting Officer*  *Commissioner of Patents and Trademarks*